United States Patent
Ryan et al.

(10) Patent No.: US 11,940,943 B2
(45) Date of Patent: Mar. 26, 2024

(54) LOW COMPLEXITY ETHERNET NODE (LEN) ONE PORT

(71) Applicant: Analog Devices International Unlimited Company, Limerick (IE)

(72) Inventors: Seamus Ryan, County Tipperary (IE); Andrew David Alsup, Albuquerque, NM (US)

(73) Assignee: Analog Devices International Unlimited Company, Limerick (IE)

( * ) Notice: Subject to any disclaimer, the term of this patent is extended or adjusted under 35 U.S.C. 154(b) by 32 days.

(21) Appl. No.: 17/623,420

(22) PCT Filed: Jun. 4, 2020

(86) PCT No.: PCT/US2020/036079
§ 371 (c)(1),
(2) Date: Dec. 28, 2021

(87) PCT Pub. No.: WO2020/263526
PCT Pub. Date: Dec. 30, 2020

(65) Prior Publication Data
US 2022/0350773 A1  Nov. 3, 2022

Related U.S. Application Data

(60) Provisional application No. 62/868,288, filed on Jun. 28, 2019.

(51) Int. Cl.
*G06F 13/42* (2006.01)
*H04L 12/18* (2006.01)
(Continued)

(52) U.S. Cl.
CPC .......... *G06F 13/4282* (2013.01); *H04L 12/18* (2013.01); *H04L 12/413* (2013.01); *H04L 47/6215* (2013.01); *G06F 2213/0002* (2013.01)

(58) Field of Classification Search
CPC ......... G06F 13/4282; G06F 2213/0002; H04L 12/18; H04L 12/413; H04L 47/6215
See application file for complete search history.

(56) References Cited

U.S. PATENT DOCUMENTS 6,141,327 A  10/2000  Kalkunte et al.
6,226,292 B1  5/2001  Diplacido
(Continued)

FOREIGN PATENT DOCUMENTS

CN  101950175 A  1/2011
CN  102710292 A  10/2012
(Continued)

OTHER PUBLICATIONS

"U.S. Appl. No. 14/492,014, Response filed Apr. 30, 2016 to Non Final Office Action dated Mar. 26, 2016", 21 pgs.
(Continued)

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

A network interface module for coupling a host device to a switched network as a network node is described. The network interface module comprises a single half-duplex port for communicatively coupling to a shared bus of the switched network, at least one frame queue sized to store one multicast read frame received via the shared bus, and logic circuitry. The logic circuitry is configured to decode a read command for the interface module included in a payload of the multicast read frame that includes multiple read commands for other network nodes of the switched network, and transmit a response frame including read data on the shared bus when detecting the shared bus is available for transmitting.

18 Claims, 14 Drawing Sheets

(51) Int. Cl.
*H04L 12/413* (2006.01)
*H04L 47/62* (2022.01)

(56) References Cited

U.S. PATENT DOCUMENTS

| | | | |
|---|---|---|---|
| 6,240,084 B1 | 5/2001 | Oran et al. | |
| 6,335,939 B1* | 1/2002 | Hanna | H04L 12/4625 |
| | | | 370/501 |
| 6,640,267 B1* | 10/2003 | Raza | G06F 5/065 |
| | | | 710/316 |
| 6,804,205 B1 | 10/2004 | Nishimura et al. | |
| 9,497,025 B2 | 11/2016 | Alsup | |
| 2005/0089059 A1* | 4/2005 | Kurita | H04L 12/4135 |
| | | | 710/113 |
| 2005/0268137 A1 | 12/2005 | Pettey | |
| 2006/0123139 A1* | 6/2006 | Lyer | H04L 49/90 |
| | | | 710/2 |
| 2006/0146829 A1* | 7/2006 | Yamada | H04L 49/901 |
| | | | 370/392 |
| 2006/0198389 A1 | 9/2006 | Eriokson et al. | |
| 2006/0224659 A1* | 10/2006 | Yu | H04L 12/437 |
| | | | 709/201 |
| 2006/0245454 A1 | 11/2006 | Balasubramanian et al. | |
| 2007/0223533 A1 | 9/2007 | Kirrmann et al. | |
| 2010/0183011 A1 | 7/2010 | Chao | |
| 2010/0268963 A1 | 10/2010 | Iizuka et al. | |
| 2011/0019673 A1 | 1/2011 | Fernandez | |
| 2011/0122883 A1* | 5/2011 | Pacella | H04L 49/9042 |
| | | | 370/412 |
| 2011/0166702 A1 | 7/2011 | Gazeau et al. | |
| 2011/0182216 A1* | 7/2011 | Ono | H04L 5/16 |
| | | | 370/282 |
| 2011/0191302 A1 | 8/2011 | Nasu et al. | |
| 2012/0243559 A1* | 9/2012 | Pan | H04J 3/1605 |
| | | | 370/503 |
| 2013/0016734 A1 | 1/2013 | Berman | |
| 2013/0148976 A1 | 6/2013 | Patel et al. | |
| 2013/0243423 A1 | 9/2013 | He | |
| 2014/0079064 A1 | 3/2014 | Angst et al. | |
| 2014/0269306 A1 | 9/2014 | Alsup et al. | |
| 2014/0269688 A1 | 9/2014 | Alsup et al. | |
| 2015/0120975 A1 | 4/2015 | Sengoku | |
| 2016/0142370 A1 | 5/2016 | Linder et al. | |
| 2017/0222829 A1* | 8/2017 | Kessler | H04L 12/40058 |
| 2019/0171590 A1 | 6/2019 | Mishra et al. | |

FOREIGN PATENT DOCUMENTS

| | | |
|---|---|---|
| CN | 114174953 A | 3/2022 |
| EP | 2926506 A1 | 10/2015 |
| JP | H10190710 A | 7/1998 |
| JP | 2000214913 A | 8/2000 |
| JP | 2000267979 A | 9/2000 |
| JP | 2000341307 A | 12/2000 |
| JP | 2002185466 A | 6/2002 |
| JP | 2004197993 A | 7/2004 |
| WO | WO-9700579 A1 | 1/1997 |
| WO | WO-2010010686 A1 | 1/2010 |
| WO | WO-2014209368 A1 | 12/2014 |
| WO | WO-2016038685 A1 | 3/2016 |
| WO | WO-2020263526 A1 | 12/2020 |

OTHER PUBLICATIONS

"U.S. Appl. No. 14/492,014, Response filed Aug. 24, 2016 to Final Office Action dated Aug. 17, 2016", 12 pgs.

"International Application Serial No. PCT/US2020/036079, International Search Report dated Aug. 19, 2020", 2 pgs.

"International Application Serial No. PCT/US2020/036079, Written Opinion dated Aug. 19, 2020", 8 pgs.

"Chinese Application Serial No. 202080054696.X, Office Action dated Oct. 19, 2023", w/o English Translation, 7 pgs.

"European Application Serial No. 20831394.0, Extended European Search Report dated Jun. 5, 2023", 4 pgs.

"International Application Serial No. PCT/US2020/036079, International Preliminary Report on Patentability dated Jan. 6, 2022", 10 pgs.

"Japanese Application Serial No. 2021-577628, Notification of Reasons for Refusal dated May 8, 2023", w/ English translation, 9 pgs.

* cited by examiner

US 11,940,943 B2

LOW COMPLEXITY ETHERNET NODE (LEN) ONE PORT

CLAIM OF PRIORITY

This application is a U.S. National Stage of PCT Application Serial No. PCT/US2020/036079, filed Jun. 4, 2020, and published as WO 2020/263526 A1 on Dec. 30, 2020 which claims priority to U.S. Provisional Application Ser. No. 62/868,288, filed Jun. 28, 2019, which are incorporated by reference herein in their entirety.

FIELD OF THE DISCLOSURE

This document relates to switched networks, and in particular to devices to interface to multi-point and multi-drop networks.

BACKGROUND

An area network (e.g., a wide area network (WAN) or a local area network (LAN)) is comprised of multiple network nodes. Information can be communicated among the nodes of the network by sending packets of data according to a protocol, such as an Ethernet protocol for example. Network switch devices can be used to implement an area network. However, a network switch typically includes multiple ports and each port includes hardware and software for communication. This makes network switch devices cost prohibitive for certain applications.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

To reduce the cost of implementing a switched network such as an Ethernet network, a low complexity multi-point or multi-drop network can be implemented using half-duplex devices.

Figure 1A:
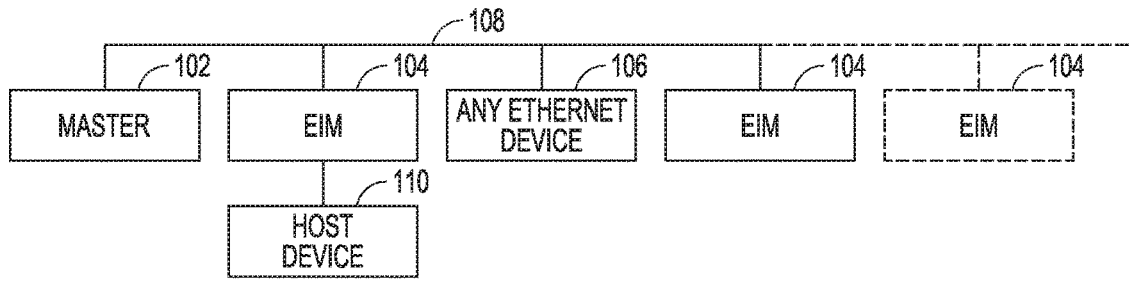
FIGS. 1A-1C are block diagrams of examples of low complexity multi-drop networks.

FIG. 1A is a block diagram of an example of a low complexity multi-drop network. The network includes a master device 102, or master node, and multiple network interface modules connected as network nodes on a shared network link 108 (e.g., a shared bus). In this example, the multi-drop network is an Ethernet network and the network interface modules are Ethernet network Interface modules (EIMs). The master device 102 may be any Ethernet aware device with sufficient processing capability to perform the functions described. Examples include a personal computer (PC), cloud-based server, a programmable logic controller (PLC), electronic control unit (ECU), central/zonal processing unit, or a dedicated controller. The master device 102 initiates actions taken by the EIMs which are slave nodes, and transmits read frames, write frames, discovery frames and status frames to the EIMs.

An EIM 104 is used to connect a device (e.g., a host device 110) to the network. To keep the EIM simple and low cost, an EIM 104 may be comprised of only hardware circuits and may include no processors or controllers performing instructions included in software. An EIM 104 may include a hardware state machine and other logic circuitry to perform the functions described. The network may include other Ethernet devices 106 besides master devices and EIMs. These other devices include a physical (PHY) layer, a medium access control (MAC) layer, and typically include a microprocessor or microcontroller to perform functions related to transferring data using the network.

The network is a multi-drop network in which all network nodes see all the data that is transmitted on the shared link (e.g., a shared bus). Due to the broadcast nature of multi-drop networks, there is a single transmitter on the network and multiple receivers at any one time. The network nodes have only a single half-duplex port to the shared network link 108. Because access to the link is shared between all network nodes, each node can only transmit when no other nodes are currently transmitting. This means the network nodes should store all relevant information to be transmitted until the shared link becomes available, at which time they can transmit their data on the shared link and all other nodes on the shared link can receive the data. The half-duplex nature of the multi-drop network also means a network node should be able to handle collisions on the shared link appropriately.

Figure 2:
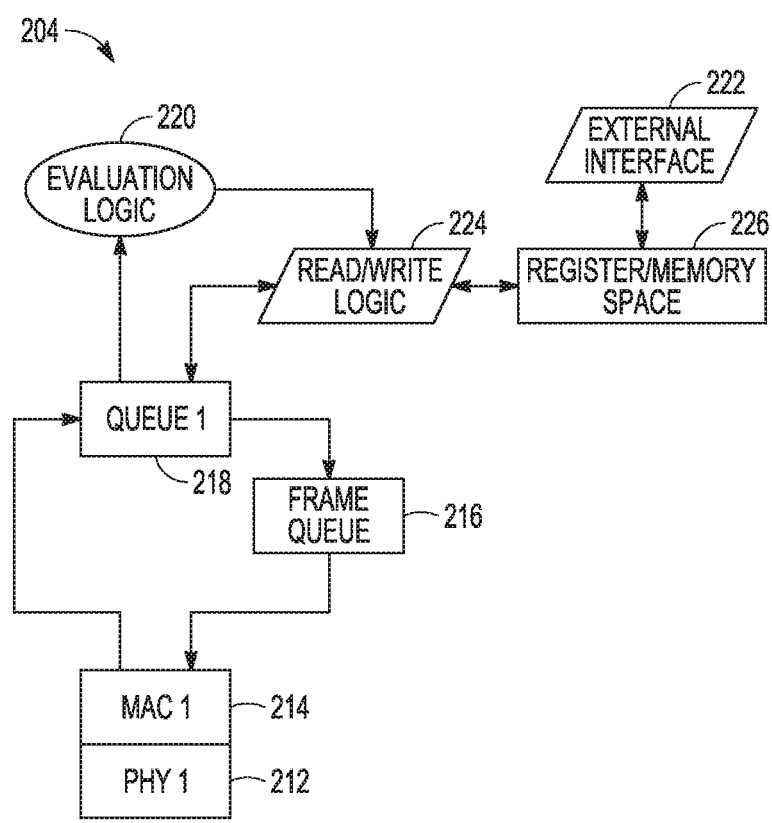
FIG. 2 is a block diagram of an example of a network interface module.

FIG. 2 is a block diagram of an example of a network interface module 204 (e.g., an EIM). The half-duplex port of the network interface module 204 includes a PHY layer 212 and a MAC layer 214. The network interface module 204 includes a frame queue 216 to buffer frames locally. Frames would be retained in the frame queue 216 until transmission is successful or a retry limit is reached. The network interface module 204 may include a short queue 218 for evaluation of a received packet by evaluation logic 220, or the evaluation logic could evaluate the frame using the frame queue 216. The evaluation logic 220 monitors a received frame as it traverses the short queue 218 and compares the destination address of the frame to the locally stored address of this device. Frames with errors are discarded. Read/write logic 224 and register/memory space 226 are used for transferring data with the connected device. The size and complexity of the read/write logic 224 and register/memory space 226 depend on the complexity of the connected device. An external device (e.g., a host device) is connected to the external interface 222. Some examples of the external interface 222 include a serial peripheral interface (SPI), a general-purpose input-output (GPIO) interface, and a universal asynchronous receiver/transmitter (UART) interface.

In a half-duplex multi-drop network, as data can only be either transmitted or received at any one time, if a node would like to transmit data out its ingress/egress port and the shared link is available the node can do so without the danger of losing incoming data (which by definition it cannot receive at the same time as it is transmitting) and there is no additional requirement to buffer received data over and above what is required for handling of collisions at the MAC layer.

This allows low complexity Ethernet devices on half-duplex Ethernet networks to easily generate frames of Ethernet data to be transmitted without it being explicitly requested from the master device in the network. The generation of the frames is usually in response to some local event. Some examples of such local events include:

- Events that occur within the node (e.g. memory access error, local timeouts, etc.)
- Events that occur on the network interface (e.g. frame check sequence error, loss/regain of lock, network overload condition dissipates, incorrect command sequence, etc.)
- Events on a sensor/actuator interface (e.g. data pushed from external sensor, external IO trigger, framing error, protocol check error, collision error, etc.)
- Time triggered events actuated relative to global synchronized time or local free running time (e.g. synchronized data capture, output or replay, heartbeat status updates, etc.)

These functions may be configured by a master device as part of the master-slave architecture of the network.

In a half-duplex multi-drop network, the network master node (e.g., master device 102 in FIG. 1A) would not be required to provide a container frame for the slave nodes to put their data into in order to query the above information from the slave nodes. There are a number of benefits to this kind of operation. The network efficiency would be improved (same or greater quantities of information for reduced network traffic). It removes the requirement for polling devices which require network access in a non-predetermined fashion. It improves latency for slave nodes to access the network.

Figure 1B:
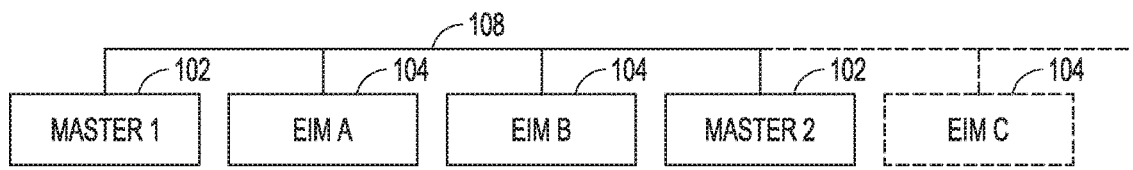

FIG. 1B is a block diagram of another example of a low complexity Ethernet multi-drop network in which the network includes multiple master devices 102 (Master 1, Master 2) and multiple EIMs 104 (EIM A, EIM B, EIM C). The network can be used to transmit unicast frames and multicast frames.

The following network sequence illustrates collision detection/backoff transmission management for unicast and multicast operations on a half-duplex multi-drop network.

1. Master 1 transmits a discover frame to the default multicast address.
2. EIM A has the shortest backoff and begins a successful transmission of a discover response frame.
3. EIM B, Master 2, and EIM C all collide when trying to transmit their responses after EIM A has finished.
4. Master 2 gets control of the link and successfully transmits its response.
5. EIM C gets control and transmits.
6. EIM B gets control of the link and transmits.

At this point both Master 1 and Master 2 have a full picture of the devices on the segment. Now, using unicast operations, Master 1 programs a few parameters into each device to optimize network operation going forward; a unicast transmission delay, a multicast transmission delay, and a maximum retry count for transmissions.

Each EIM would be programmed with a minimum Unicast Transmission Delay value to minimize transmit/response time. For multicast delays the devices will be prioritized so that there are no collisions and the timing of responses are always similar. Retry counts can be set to small values so that the master devices 302 can quickly respond to a failure.

EIM A
Unicast transmission delay TX_DELAY_MIN
Multicast transmission delay MCAST_TX_DELAY_MIN
Maximum retry count 2 (for example)

EIM B
Unicast transmission delay TX_DELAY_MIN
Multicast transmission delay MCAST_TX_DELAY_MIN+DELAY_INCREMENT
Maximum retry count 2

EIM C
Unicast transmission delay TX_DELAY_MIN
Multicast transmission delay MCAST_TX_DELAY_MIN+(2*DELAY_INCREMENT)
Maximum retry count 2

This maximizes the overall responsiveness of the network, and both unicast and multicast operations can be used. Note that in this case, unicast operation would proceed as follows:

Master device sends a single multicast frame
Each EIM responds to the frame in sequence.

Figure 1C:
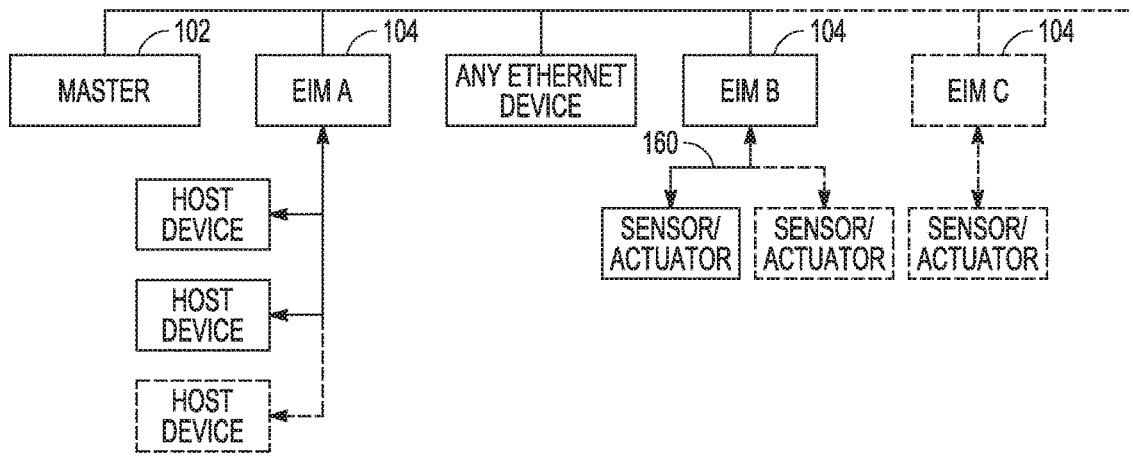

FIG. 1C is a block diagram of another example of a low complexity Ethernet multi-drop network in which the network includes a master device 102 and multiple EIMs 104 (EIM A, EIM B, EIM C) connected to the shared network link 108. EIM B connects multiple sensors or actuators to the shared network link 108. The multiple sensors or actuators are added to a shared bus 160 that is connected to the external interface of EIM B. In certain examples, multiple sensors/actuators are connected in parallel using for example an SPI, GPIO interface, or DART interface. In certain examples, the multiple sensors/actuators are connected to the EIM through analog signal inputs and outputs.

Figure 3A:
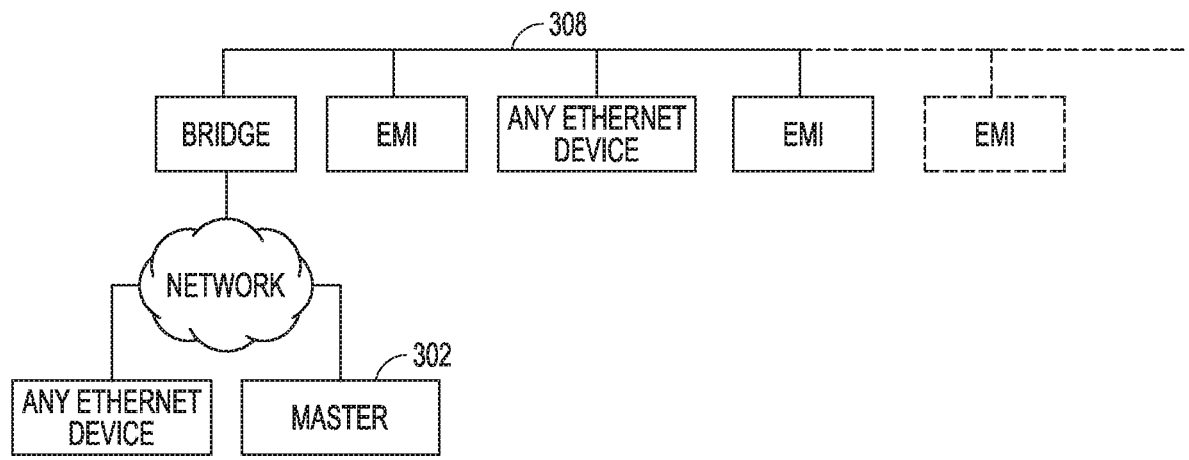
FIGS. 3A-3B are block diagrams of further examples of a low complexity multi-drop network.

FIG. 3A is a block diagram of another example of a low complexity Ethernet multi-drop network. The master device 302 is connected through an intermediate network connection (e.g., a network bridge device), and does not need to be connected to the slave node by the network link 308.

Figure 3B:
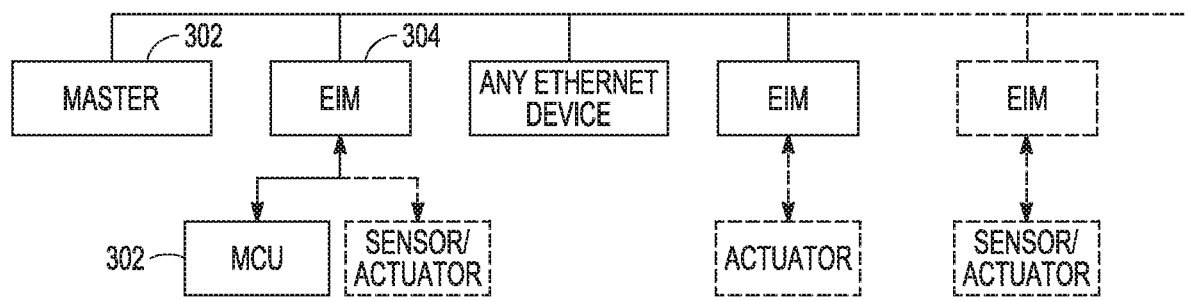

FIG. 3B is a block diagram of still another low complexity Ethernet multi-drop network. The network includes multiple master devices 302, but one of the master devices (e.g., a microcontroller unit, or MCU) is connected to the network through an EIM 304. The master device connected through the EIM includes a PHY layer and MAC layer connected to a micro controller. This allows the slave device to function as both a master device and a slave device.

Figure 4A:
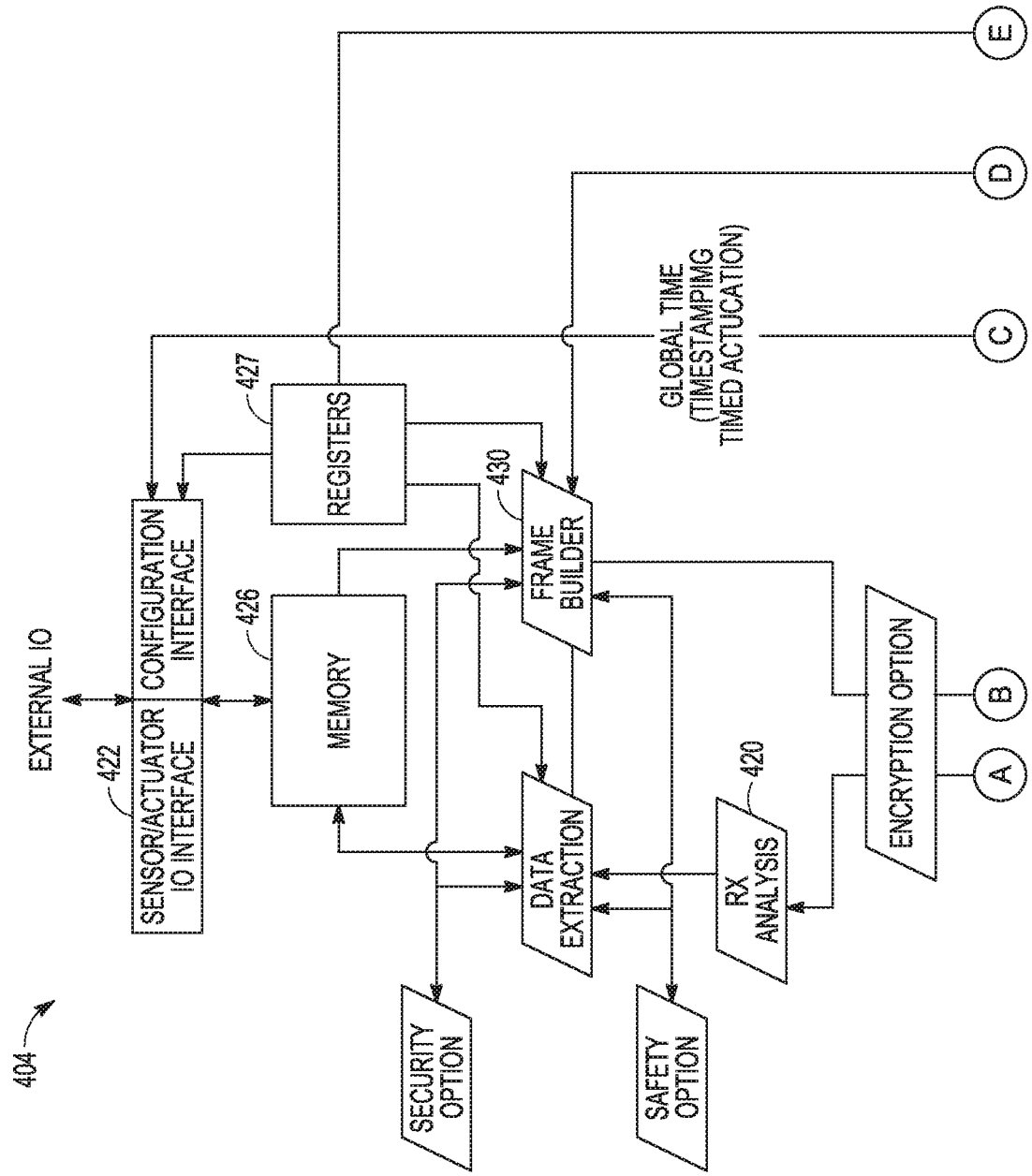
FIGS. 4A-4B show a block diagram of another example of a network interface module.
Figure 4B:
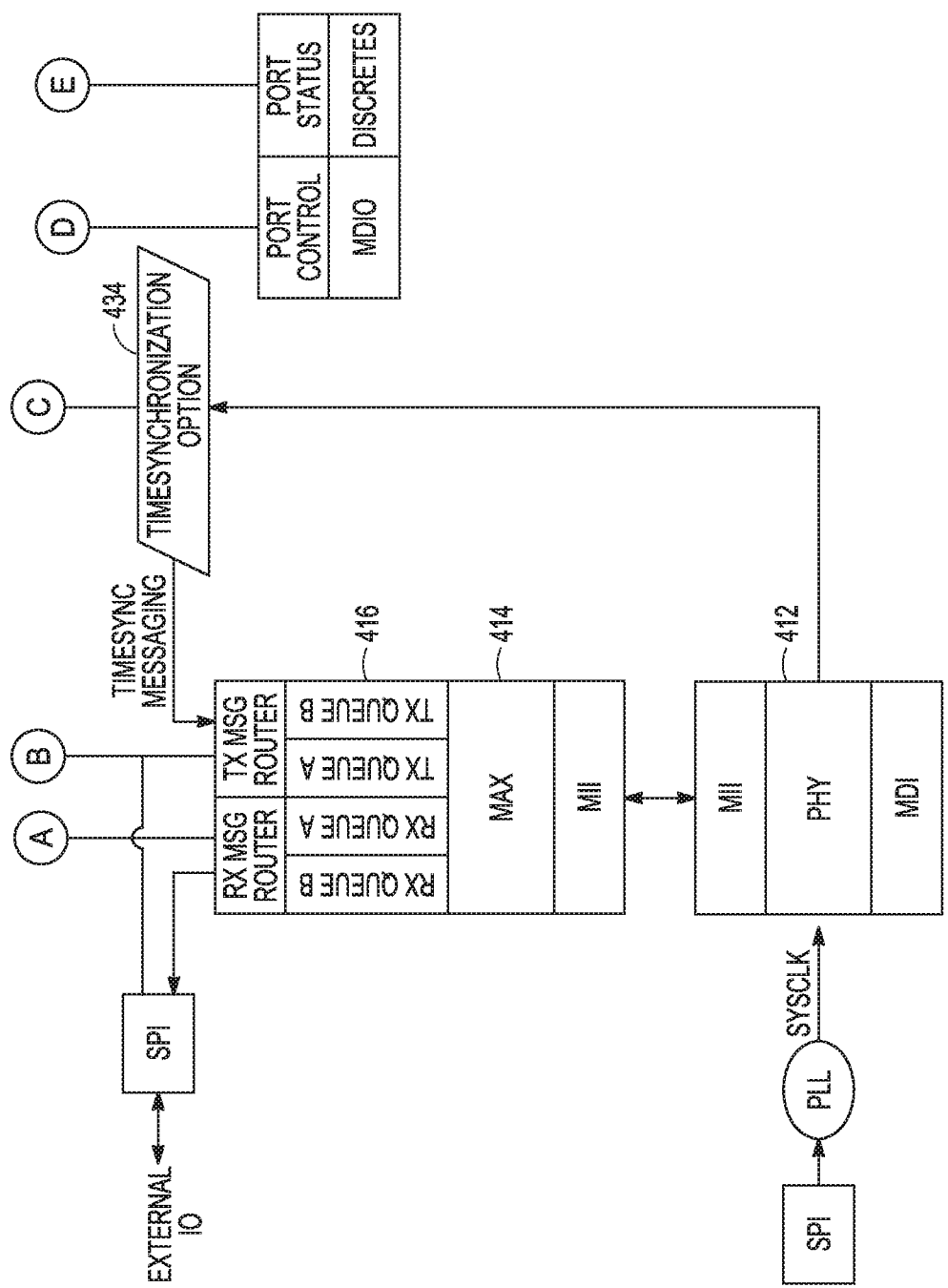

FIGS. 4A and 4B show a block diagram of an example of a network interface module that is an EIM 404. The EIM 404 couples a host device (not shown) to a multi-drop network as a low complexity half-duplex network node for the multi-drop network. In variations, the host device can be a sensor or actuator and the network interface module enables the host device to become part of an industrial internet of things (IIoT). In other variations, network interface module allows the host device to become part of a network for automotive, aircraft or railway applications, In FIG. 4B, the half-duplex port of the EIM 404 includes a PHY layer 412, a MAC layer 414, and an external input/output (IO) interface. The external interface 422 to the associated device can include one or both of an SPI and a GPIO interface. Other options for the external interface can include an inter-integrated circuit (I2C) interface, improved inter-integrated circuit (I3C) interface, a controller area network (CAN) interface, a CAN flexible data rate (CAN-FD) interface, a Next Evolution CAN (CAN-XL) interface, a local internet network (LIN) interface, a general purpose clocked IO, a UART, peripheral sensor interface 5 (PSI5), etc. The EIM 404 may include a second external interface having a dedicated SPI 424 in addition to the half-duplex port MAC layer and PHY layer. This allows the EIM 404 to function as a dual master and slave device as in the example of FIG. 3B. This may be useful, as an example, to have a low complexity Ethernet (LCE) slave device connected to a sensor/actuator and in parallel an MCU operating as a master to additional devices connected through the dedicated SPI 424.

Memory 426 (e.g., random access memory or RAM) and registers 427 are used for transferring data with the host device. The EIM 404 includes receive analysis logic circuitry 420 to evaluate received frames. The EIM 404 also includes a high priority frame queue 416 and a low priority frame queue 417. Multiple receive (Rx) and transmit (Tx) queues 416 allow the traffic to be directed to and from either the dedicated SPI 424 or the half-duplex port on a frame by frame basis, and also allows traffic prioritization for both transmit and receive. The queues are each large enough to store at least one frame of the maximum frame size. In some aspects, the queues do not hold an entire frame. The queues 416 may only store the source address, destination address, VLAN header, Ethertype, LEN sub-commands and LEN commands, and the payload is read from the Memory 426 as the frame is being generated on the fly.

The EIM 404 also includes a frame builder 430. The frame builder 430 may include state machine logic circuitry to build frames for transmitting. The frame builder 430 may build the frames on the fly (e.g., as they are transmitted). The frame builder 430 builds a frame that includes a frame header (e.g., a standard Ethernet frame header) network commands and payload data read from memory 426.

The EIM 404 may also include a parallel interface path to an external MCU. This may operate in addition to the low complexity network interface which controls external sensors/actuators. This interface has access to the MAC layer through the high and low priority Tx and Rx queues 416. Frames are routed to either the low complexity interface or the external MCU based on the destination address of the received frame. The Tx message router will arbitrate access to the MAC. This parallel interface to an external MCU provides it with network access at the same time as local sensors and actuators are controlled via the low complexity network interface.

The EIM 404 may include encryption logic circuitry 432. A master node may communicate encrypted data with the EIM 404 as a slave node. The encryption logic circuitry 432 may use a unique key to encrypt and decrypt the data. The EIM 404 may include timestamping logic circuitry that adds a timestamp to the frames indicating when the frames are sent or received.

The EIM 404 may include time/synchronization circuitry 434 connected to the PHY layer 412 to provide a hardware-based option for time synchronization. This hardware will process time synchronization frames (802.1AS-rev) and use the information within, in addition to captured event timestamps for ingress and egress frames, to synchronize and syntonize a local clock to the global time transported from a network grand master clock contained within the synchronization frames. A global time interface goes to the external interface 422 where it can be used to timestamp data capture/schedule timed actuation/create synchronized clock sources. The time synchronization hardware sends and receives time synchronization frames in order to compute network delay and request and respond to time synchronization information. The synchronized time is used locally to actuate events based on the synchronized time, to create synchronized clock sources and also to timestamp events both internally and on the sensor/actuator interfaces.

Ethernet unicast and multicast write frames that arrive on the half duplex port are checked for relevant Ethertype, address and command, and are decoded and processed according to the network protocol (e.g., Ethernet protocol) implemented by the multi-drop network. Where appropriate, data is written to the relevant section or sections of the RAM 426. Due to the shared link, collisions are possible and quite likely; this means that there will be many instances where partial frames are received before collision is detected. The network protocol takes care of these situations by not executing any host actions or register writes until a frame is fully received and the frame check sequence (FCS) is verified.

Figure 5:
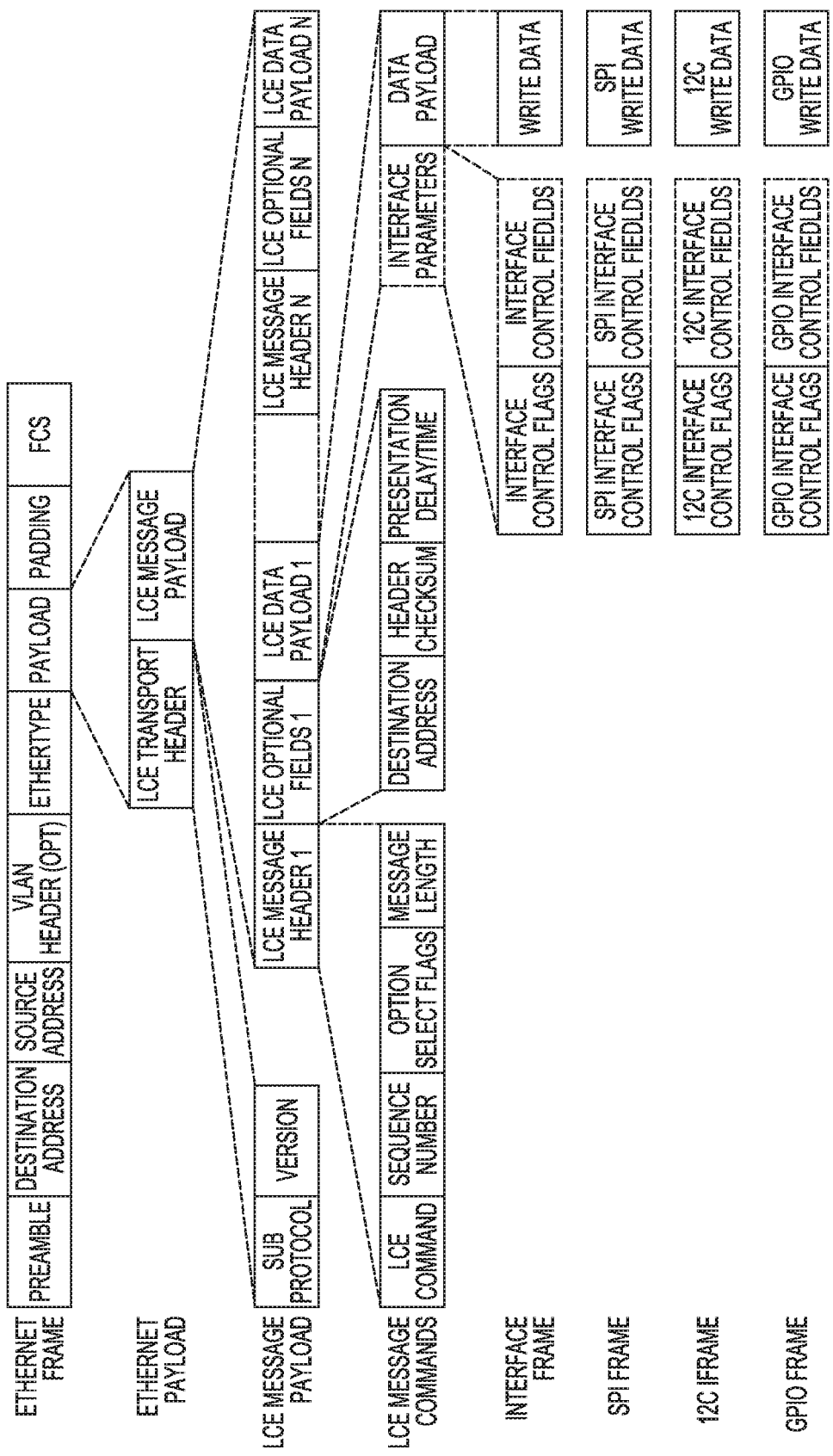
FIG. 5 is an example of a multicast write frame for a half-duplex multi-drop network.

The EIM 404 is able to receive and process unicast and multicast frames. FIG. 5 is an example of a multicast write frame containing multiple low complexity Ethernet commands for a multi-drop network. Multicast frame writes have some significant advantages in terms of data efficiency and latency over unicast frame writes. In a multicast frame, the overhead of preamble, destination address, source address, virtual local area network (VLAN) header (if included), Ethertype, padding (if needed), and FCS are shared between each node that is addressed by the multicast address. A single multicast frame that contains these fields is sent only once along with the data and/or commands to be written to each node (e.g., nodes 1 through N in FIG. 5 where N is an integer greater than 1), and each node extracts the data and commands destined for the node. The extracted data may then be transferred to a host device associated with the slave node.

The message payload can include a "destination override" field to allow each individual command to be directed to one or more interfaces within a multicast group of slave devices. Fixed offset positions for the data for each device are not needed.

Each LCE command may receive a sequence number. These sequence numbers are sequentially incremented. If an interface receives a command with an out of order sequence number, that command will not be processed. An optional error event interrupt frame may also be generated and sent back to the master device originating the command. All locally generated messages within the EIM will also contain a sequence number which must be validated by the master upon reception. Acknowledgement frames can be requested from LCE slave nodes by setting an appropriate flag in the LCE command header. When these requests are received and processed by an LCE slave device, it will respond with a frame containing the next expected sequence number that it expects to receive. When an out of order sequence number is received, the next expected sequence number is not incremented and the slave device will therefore always respond indicating the point at which the sequence was interrupted, allowing the master device to take the appropriate corrective action.

Figure 6:
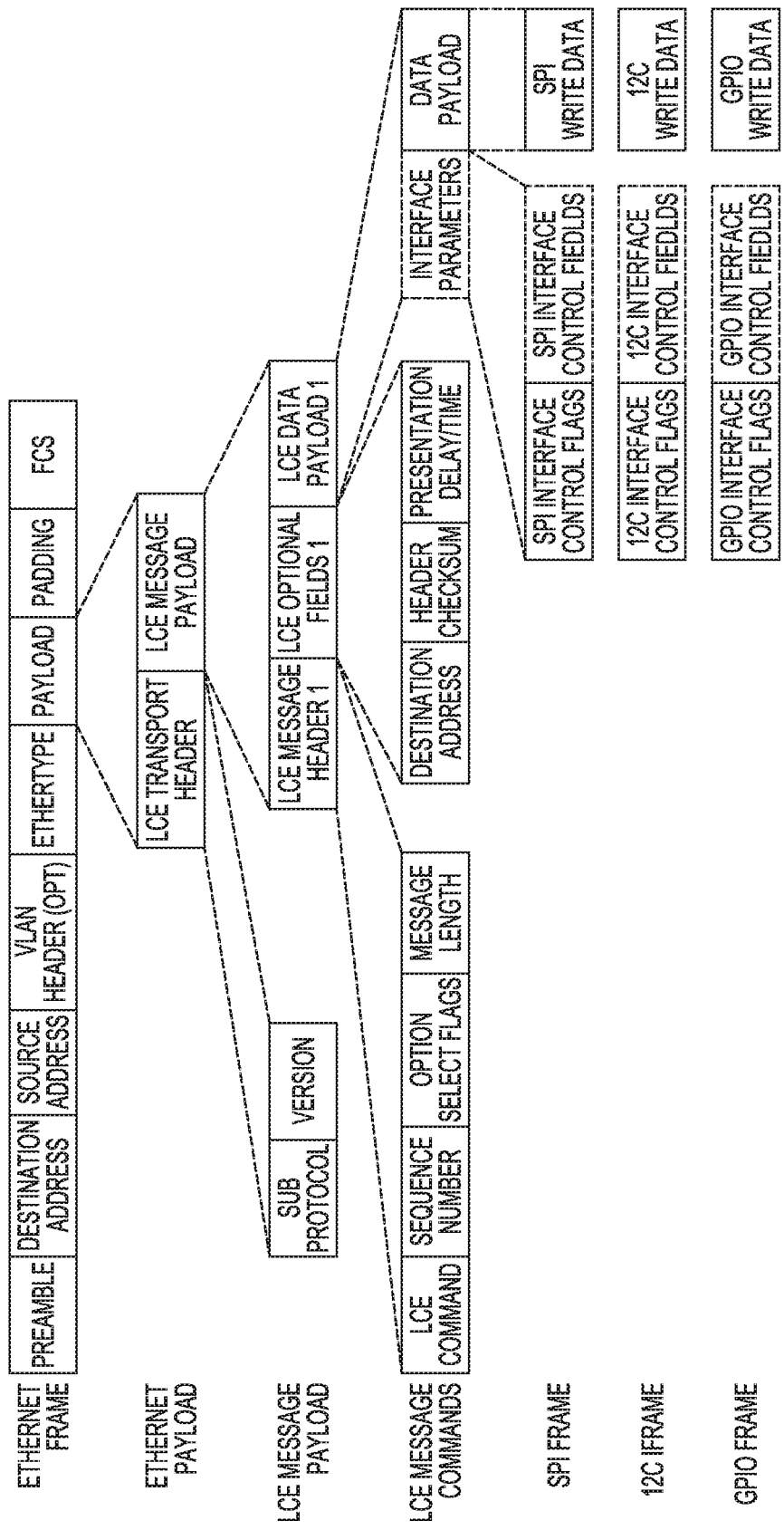
FIG. 6 is an example of a unicast write frame for a half-duplex multi-drop network.

FIG. 6 is an example of a unicast write frame containing a single LCE command for a multi-drop network. The unicast write frame is sent to one network node. The unicast addressing of each node would require the fields to be uniquely replicated in the unicast frame sent to each node (e.g., once for each of N nodes). A destination override filed is not needed.

The multicast multi-command frame is also very efficient in terms of latency. Not having to repeat all of the above fields for each frame means that the time required to get data from a transmitting node to a group of multicast receiving nodes is significantly reduced. The relative scale of the reduction is related to the size of the payload. For small payloads the data efficiency improvement is significant, as the payload size increases the Ethernet overhead relative to the payload decreases, and so does the latency advantage achieved from using multicast addressing versus unicast addressing.

In addition to relative synchronization of output actuation or input capture, multiple EIMs can be pre-loaded with the required data and/or commands, and a subsequent multi-cast frame can be used to trigger the operation on all nodes in parallel. As the EIM is hardware-based and will not incur variable software processing latency of traditional solutions at each node, accurate relative time synchronization accuracy can be achieved.

Network read frames, read/write frames, configuration read frames, discovery return frames, and status return frames are also received, decoded, and processed by the EIM 404. Because of the half-duplex operation of the EIM 404, the relevant sections of the frames are stored in a priority queue until the shared link is available for transmission of a response frame. The stored frame fields include:
  Source address (destination address of returned frame)
  VLAN headers
  network subcommands
  network command
    +relevant payload section
  Priority of the frame
What does not need to be stored in a queue may include:
  FCS (checked but not stored),
  Non-applicable multicast fields relating to other network nodes
  Data to be written to memory 426.

The queues 416 may store transmission requests until the shared bus is available. Once available the highest priority queue would send its data for transmission first. The queues 416 also contain priority receive queues which allows more important messages to receive precedence in processing over lower priority frames, thus increasing the responsiveness of the network to such frames. The priority queues can also be used in conjunction with a schedule synchronized to the global time provided by the time synchronization circuitry 434 to further improve the determinism of the network and performance of these low complexity Ethernet devices.

When there is an opportunity to transmit, the response frame may be built by the frame builder 430 on the fly. After the standard Ethernet frame header is built from a combination of the stored frame request and pre-configured registers, the appropriate network sub-commands and commands are entered followed by the data payload contents read directly from the memory 426. The contents of the memory 426 and stored frame request contents would not be overwritten in a queue until the full frame had been transmitted successfully over the shared link or the retry limit was reached. A response frame may also be transmitted as a frame reception acknowledgement without the inclusion of any read data.

When the transmission is successfully completed, the transmit request and memory related contents would be freed up for write access. If a collision occurred at any point during the transmission, the frame generation process could either be frozen, re-wound (back to specific point dependent on how much data was stored in the MAC+PHY), or re-started fully, depending on the architecture of the MAC layer 414 and PHY layer 412 with which the frame builder 430 interfaces. This is possible because all the relevant data is still available (e.g., in a frame queue) and hasn't been overwritten or deleted because of the detection of the collision.

The data returned from the EIM 404 to the network master device when multicast requests are received is optimized versus the data that would be forwarded in a full duplex point-to-point network approach in which two ports connect the devices in a daisy chain topology. Only the requested data relevant to the specific network node is returned by the network node. Also requests for data from the master device are not required to insert space within the frame for the EIM 404 to insert that data. This improves the efficiency of the network in terms of channel capacity usage versus a full duplex point-to-point transmit approach.

Figure 7:
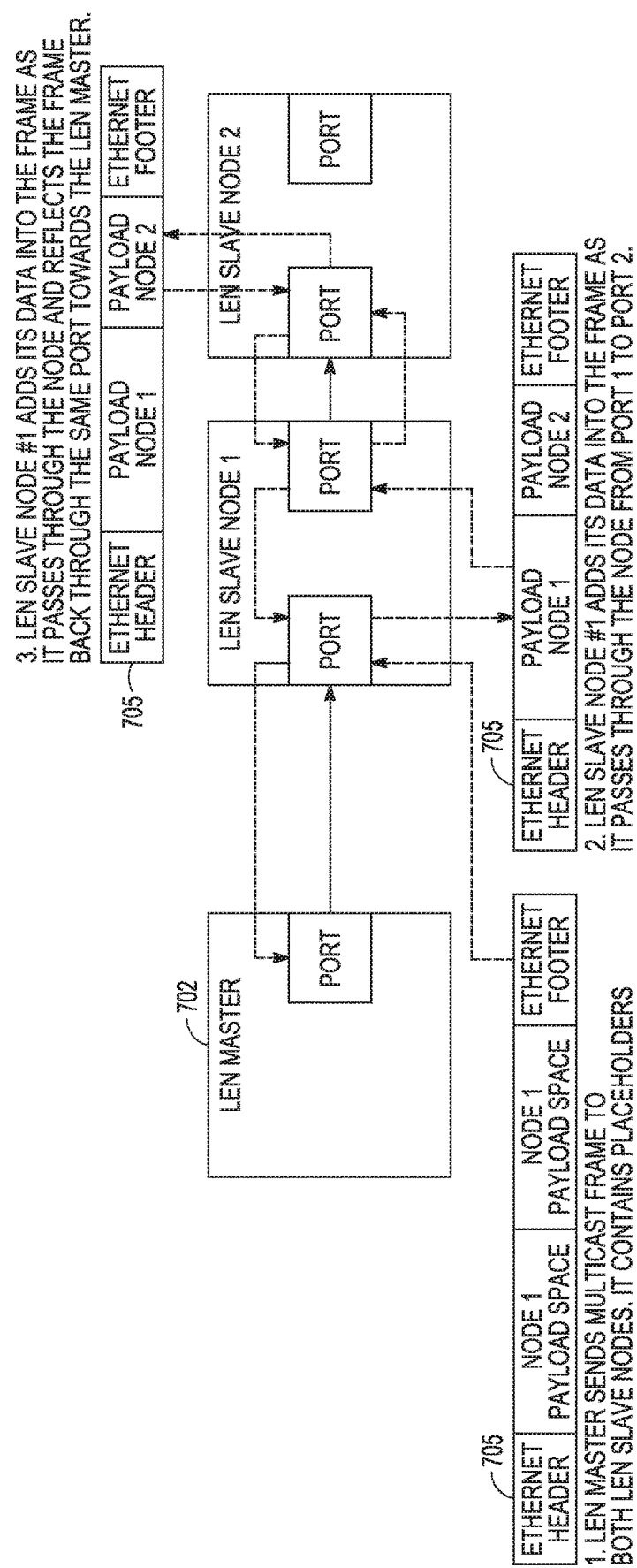
FIG. 7 is an illustration of an example of a multicast read request for a full duplex point-to-point network.

FIG. 7 is an illustration of an example of a multicast read request for a full duplex point-to-point network. In the example, the network master node 702 sends a multicast read frame 705 to two slave nodes (slave node1, slave node 2). The multicast read frame 705 includes payload space for the requested data from each of slave node1 and slave node 2. The multicast read frame 705 is passed from the master device to slave node 1, which processes the multicast read frame 705 and modifies the frame by inserting its requested data into the slave node 1 payload space of the multicast frame. Slave node1 then passes the multicast read frame 705 to slave node 2 which processes the multicast read frame and inserts its requested data into the slave node 2 payload space. Because the network is a full duplex point-to-point network, slave node 2 reflects the multicast read frame 705 back out the port on which it received the multicast frame back toward the master device 702.

It can be seen the network capacity is not fully utilized as the multicast read frame 705 has to be passed point-to-point form node to node to be filled and then again to be returned to the master device 702. The channel capacity usage decreases as the number of nodes increases. For example, if the master device 702 wanted to read 100 bytes of data from 8 slave nodes, the master device 702 would need to construct a multicast read frame that included payload space for the 800 bytes of data in addition to the standard Ethernet frame protocol fields. The large multicast read frame would then have to be received, modified, and transmitted by each of the 8 slave nodes (and received and transmitted by any intervening nodes) in the point-to-point network to collect the data from all 8 slave nodes.

Figure 8:
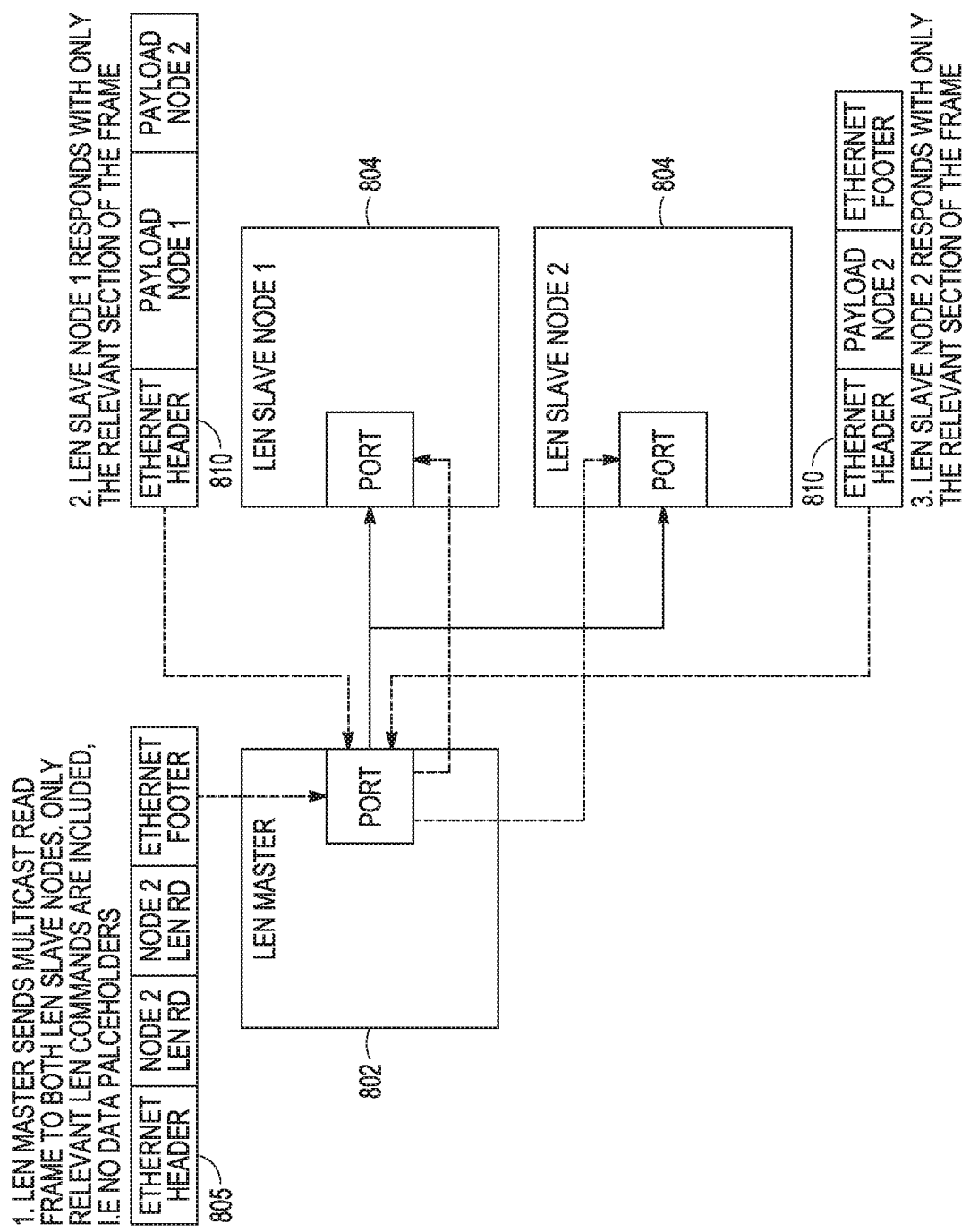
FIG. 8 is an illustration of an example of a multicast read request for a half-duplex multi-drop network.

FIG. 8 is an illustration of an example of a multicast read request for a half-duplex multi-drop network. In the example, the network master node 802 sends a multicast read frame 805 to two slave nodes (slave node1, slave node 2). The slave nodes 804 may be EIMs. Each slave node decodes one or more commands included in the frame and returns a response frame 810 with the requested read data to the master device 802.

For the example where the multicast read frame 805 is built to request the 100 bytes of data from 8 slave nodes on a half-duplex multi-drop network, the frame only requires the standard Ethernet fields and the multi-drop network protocol fields. The multicast read frame 805 does not require the additional 800 bytes of payload space needed to carry the requested data from each slave node. The response frame 810 transmitted from each slave node only includes the requested 100 bytes and does not include the additional 700 bytes from the other 7 slave nodes.

Figure 9:
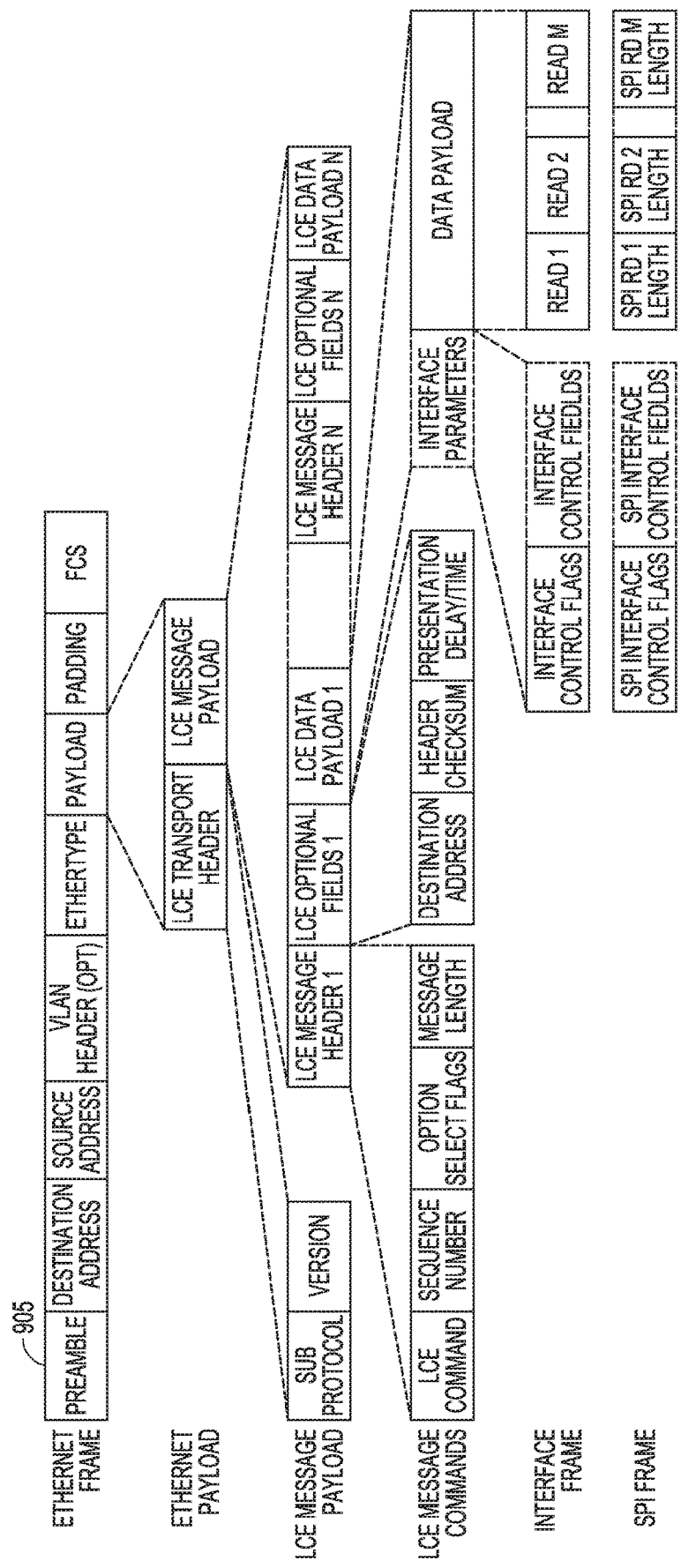
FIG. 9 is an example of a multicast read frame for a half-duplex multi-drop network.
Figure 10:
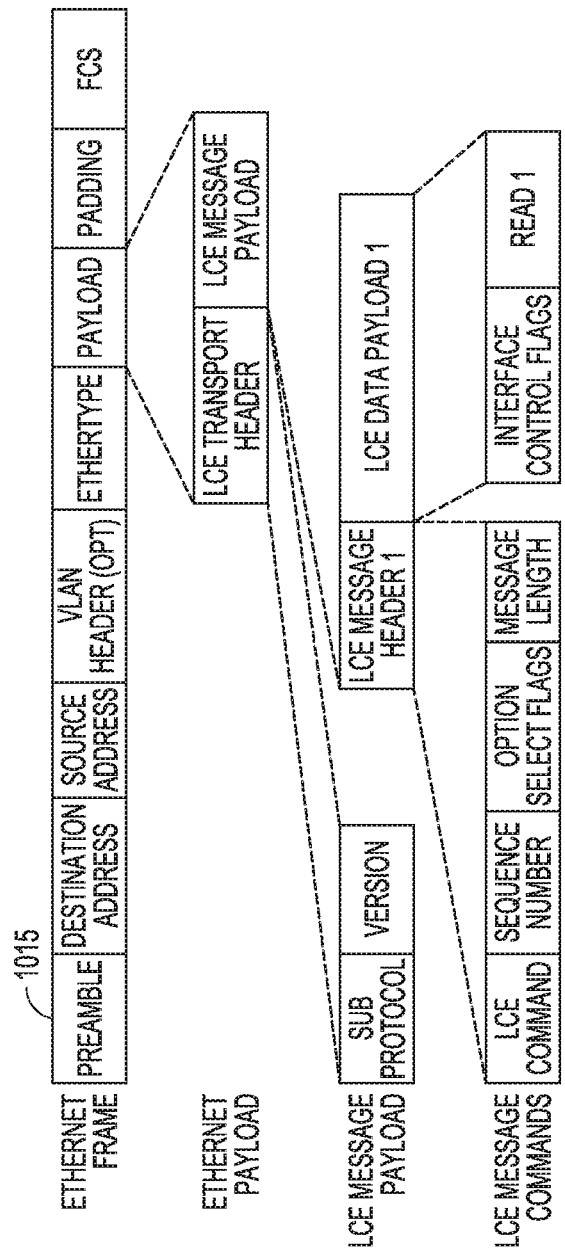
FIG. 10 is an example of a unicast read frame for a half-duplex multi-drop network.

FIG. 9 is an illustration of a multicast frame 905 of multiple read commands that are destined for different EIM devices for a half-duplex multi-drop network. Multiple commands can be contained within a single frame, and the individual commands may contain multiple interface commands for a particular interface type (e.g., SPI, I2C, etc.). FIG. 10 is an illustration of a unicast frame 1015 comprised of a single read command for a half-duplex multi-drop network. There is not a requirement for the multicast read frame to include payload placeholders for half-duplex multicast read operations. The receiving slave node waits until the shared link transmission medium is available before returning the requested data to the master node. This allows the multicast read request frames to be optimized as shown in FIG. 9. The frame only requires the standard Ethernet fields and the multi-drop network protocol fields (e.g., network commands and subcommands). The read frames include an SPI command field and an SPI size field to indicate how many bytes are to be read. It is to be noted that a placeholder for a SPI payload is not included in the frame. The larger the amount of data being read from the slave node the greater the data efficiency improvement. The data efficiency improvement is further increased for multicast read operations as multiple read data placeholders are eliminated.

The devices, systems and methods described herein provide low complexity multi-drop switched networks. The protocol for the network utilizes multicast and unicast operations that optimize use of channel capacity.

Figure 11:
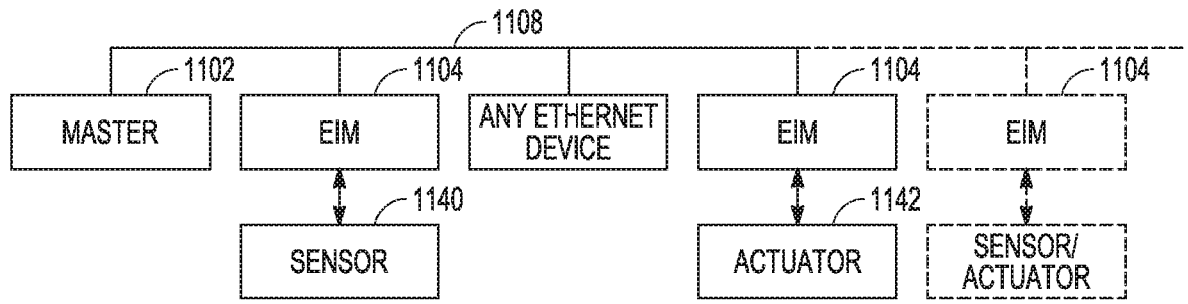
FIGS. 11-17 are block diagrams of further examples of a low complexity multi-drop network.

FIG. 11 is a block diagram of another example of a low complexity multi-drop network. The network includes one or more master devices 1102 and multiple EIMs 1104 connected as network nodes on a single Ethernet link 1108 that connects multiple sensors and actuators 1142 in a multi-drop fashion. The single low complexity multi-drop network 1100 can support replacement of multiple legacy networks. No processing is required at a sensor node 1140 or actuator node 1142 enabling all processing to be performed at the master node 1102. The master node 1102 may be incorporated in a central or zonal processing unit or other electronic control unit (ECU). The network can be used to provide connectivity of sensors and actuators for car doors and car seats.

Figure 12:
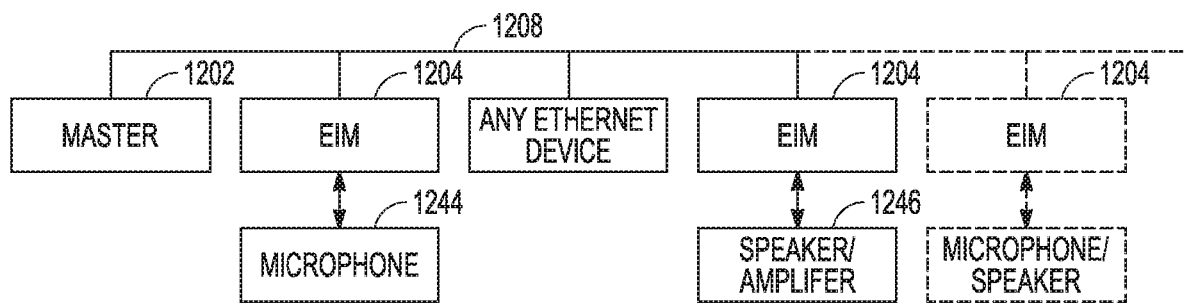

FIG. 12 is a block diagram of another example of a low complexity multi-drop network. The network includes one or more master devices 1202 and EIMs 1204 connected as network nodes on a single Ethernet link 1208 that connects multiple audio devices such as microphones 1244 and speakers 1246 to the network. The network supports Ethernet connectivity to the multiple audio devices without the need for processing at the audio device nodes. This provides a low latency deterministic connection for automotive applications.

Figure 13:
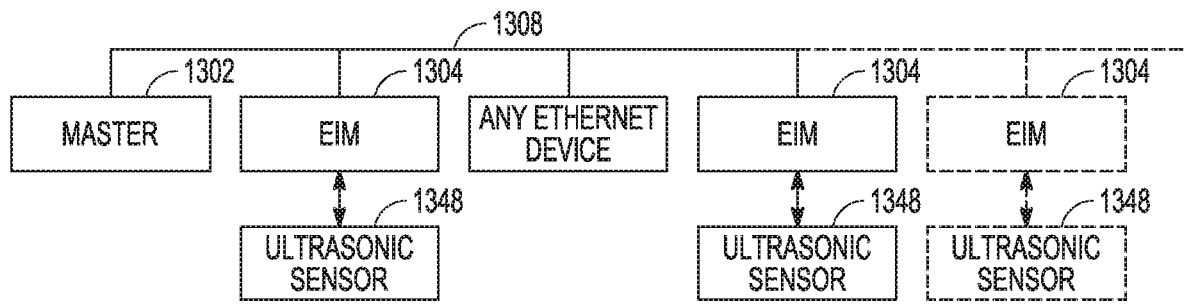

FIG. 13 is a block diagram of another example of a low complexity multi-drop network. The network includes one or more master devices 1302 and EIMs 1304 connected as network nodes on a single Ethernet link 1308 that connects multiple ultrasonic sensors 1348 or other ultrasonic devices to the network. The multi-drop approach enables the processing to be removed from each ultrasonic sensor and consolidates the processing in the master node 1302.

Figure 14:
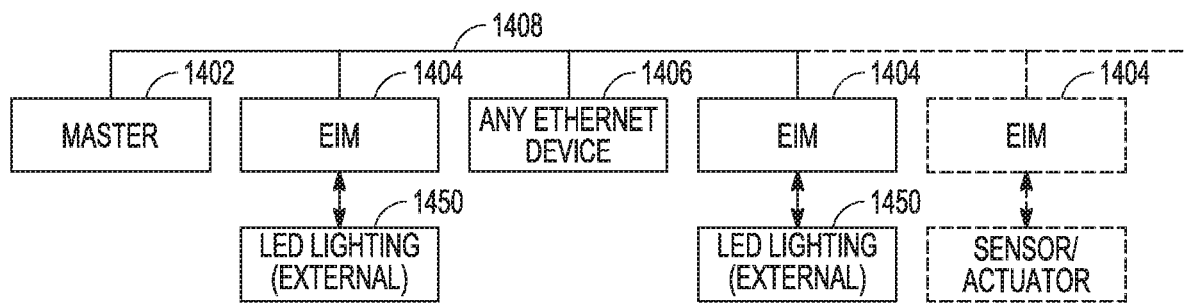

FIG. 14 is a block diagram of another example of a low complexity multi-drop network. The network includes one or more master devices 1402 and EIMs 1404 connected as network nodes on a single Ethernet link 1408 that connects multiple arrays of light emitting diodes (LED arrays 1450) to the network. The LED arrays 1450 could be used for interior lighting in vehicles or external headlights in vehicles. Traditional Ethernet devices 1406 not using low complexity technology can also be connected to the network.

Figure 15:
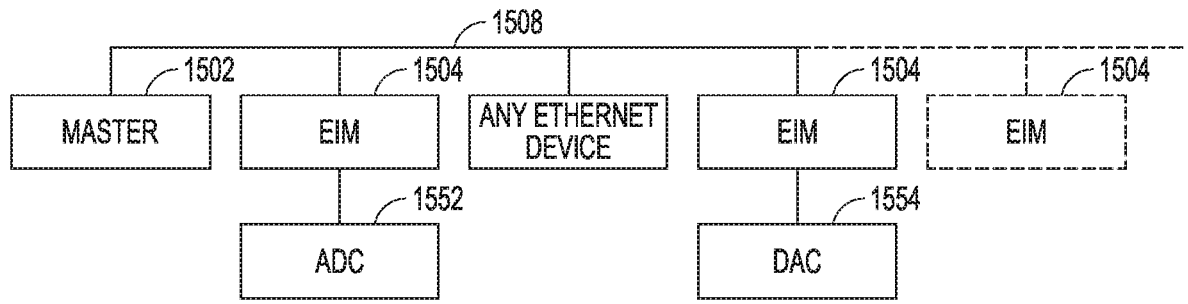

FIG. 15 is a block diagram of another example of a low complexity multi-drop network. The network includes one or more master devices 1502 and EIMs 1504 connected as network nodes on a single Ethernet link 1508 that connects analog-to-digital converter (ADC) devices 1552 and digital-to-analog converter (DAC) devices 1554.

Figure 16:
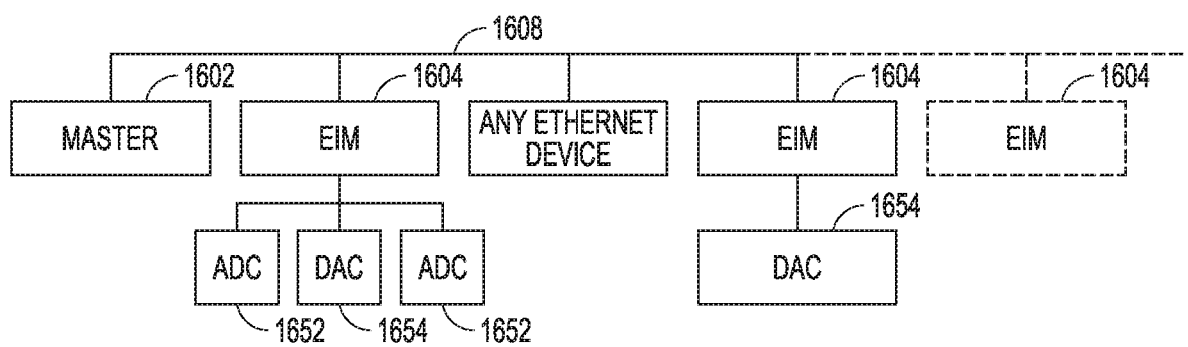

FIG. 16 is a block diagram of another example of a low complexity multi-drop network. The network includes one or more master devices 1602 and EIMs 1604 connected as network nodes on a single Ethernet link 1608. Like the network in FIG. 15, the network connects analog-to-digital converter (ADC) devices 1652 and digital-to-analog converter (DAC) devices 1654, but multiple ADCs and DACs can be connected to a single EIM 1604.

Figure 17:
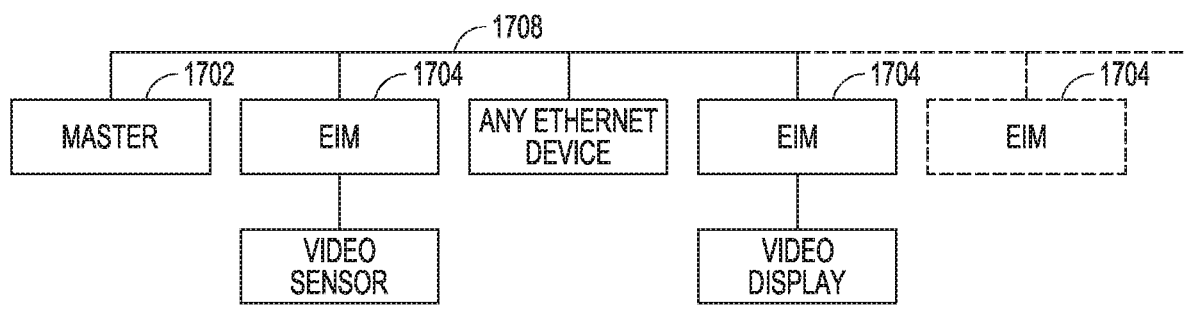

FIG. 17 is a block diagram of another example of a low complexity multi-drop network. The network includes one or more master devices 1702 and EIMs 1704 connected as network nodes on a single Ethernet link 1708 at connects video sensor devices 1756 and video display devices 1758.

Figure 18:
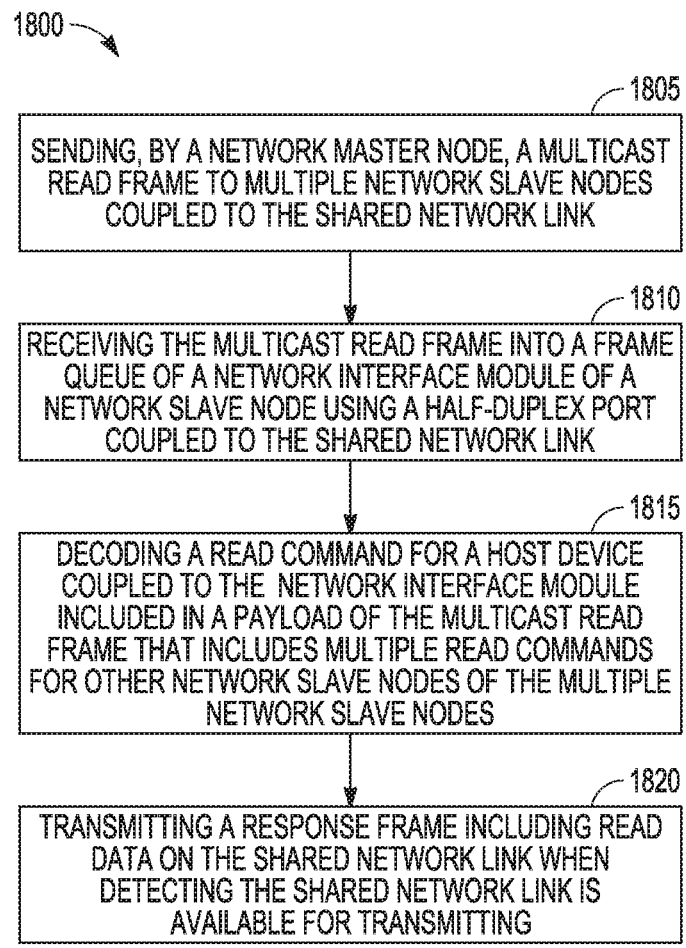
FIG. 18 is a flow diagram of an example of a method of controlling operation of a switched network.

FIG. 18 is a flow diagram of an example of a method 1800 of controlling operation of a switched network. The switched network may be any of the example networks described herein. The switched network is a multi-drop switched network in which all network nodes see all the data that is transmitted on a shared network link.

At 1805, a multicast command frame is sent from a network master node to multiple network slave nodes coupled to the shared network link. The network slave nodes include nodes that are coupled to the shared link using a network interface module.

At 1810, the multicast frame is received into a frame queue of a first network interface module of a first network slave node. The multicast frame is received using a half-duplex port coupled to the shared network link. At 1815, if the multicast frame is a multicast read frame for a host device coupled to the first network interface module, the first network interface module decodes a read command in the payload of the multicast frame. The payload of the multicast frame can include multiple read commands for other network slave nodes of the multiple network slave nodes.

Read data is retrieved from the host device by the first network interface module and at 1820, a response frame including read data is transmitted on the shared network link when detecting the shared network link is available for transmitting. The multicast frame may be received on an interface to the switched network that is a half-duplex port that includes a PHY layer and a MAC layer, and the response frame may be transmitted using the half-duplex port. The read data may be obtained from the host device using a second interface coupled to the host device.

The network interface module of the first slave node may include a third external interface connected to a second master node not connected to the shared network link. The network interface module may receive a command for one or more other slave nodes from the second master node and broadcast the command using the half-duplex port when the shared link is available.

The low complexity provides advantages of using the networks described in various technical areas such as automotive, aircraft and railway applications, industrial automation, building automation (e.g., control of sensors, elevators, etc.). Other technical areas include backplane applications (e.g., for the physical layer of a multipoint low voltage differential signaling (M-LVDS) network).

Additional Description and Aspects

A first Aspect (Aspect 1) includes subject matter (such as network interface module) comprising a first external interface including a single half-duplex port for communicatively coupling to a shared bus of a switched network; a second external interface for communicative coupling to a host device; at least one frame queue sized to store one multicast read frame received via the shared bus; and logic circuitry. The logic circuitry is configured to decode a read command for the interface module included in a payload of the multicast read frame that includes multiple read commands for other network nodes of the switched network; and transmit a response frame including read data on the shared bus when detecting the shared bus is available for transmitting.

In Aspect 2, the subject matter of Aspect 1 optionally includes a third external interface including a dedicated serial peripheral interface (SPI) for communicatively coupling a network master node to the shared bus of the switched network.

In Aspect 3, the subject matter of one or both of Aspects 1 and 2 optionally includes a frame queue sized to store one multicast write frame, and logic circuitry configured to extract write data from a specified portion of the multicast write frame that includes multiple portions containing write data for other network nodes of the switched network and send the extracted write data to the host device.

In Aspect 4, the subject matter of one or any combination of Aspects 1-3 optionally includes a higher priority frame queue and a lower priority frame queue, and the logic circuitry configured to transmit a frame from the higher priority queue before transmitting a frame from the lower priority queue when detecting the shared bus is available for transmitting.

In Aspect 5, the subject matter of one or any combination of Aspects 1-4 optionally includes a network interface module included in a network slave node and the payload of the multicast read frame includes multiple commands for the network slave node and other network slave nodes, and logic circuitry configured to decode a command addressed to the network slave node and transmit the read data to a master node of the switched network when detecting the shared bus is available for transmitting.

In Aspect 6, the subject matter of one or any combination of Aspects 1-5 optionally includes logic circuitry configured to retain the response frame in the at least one frame queue when a collision is detected when transmitting the response frame on the shared bus.

In Aspect 7, the subject matter of one or any combination of Aspects 1-6 optionally includes logic circuitry configured to decode a read or write command for the interface module included in a payload of a frame.

In Aspect 8, the subject matter of Aspect 7 optionally includes a payload of a frame including multicast read or write commands that are targeted to other network nodes.

In Aspect 9, the subject matter of one or any combination of Aspects 1-8 optionally includes multiple interface types; and logic circuitry configured to decode multiple commands for the network interface module included in a payload of a received frame and decode multiple commands for the multiple interface types included in one command of the multiple commands.

In Aspect 10, the subject matter of one or any combination of Aspects 1-9 optionally includes logic circuitry configured to transmit the response frame without data as a frame reception acknowledgement.

Aspect 11 can include subject matter (such as a switched network) or can optionally be combined with one or any combination of Aspects 1-10 to include such subject matter, comprising a first network master node; and a network slave node that includes a host device connected to the network by a network interface module. The network interface module includes a first external interface including a single half-duplex port connected to a shared bus of the switched network; a second external interface connected to a host device; at least one frame queue sized to store one multicast read frame received via the shared bus; and logic circuitry configured to decode a read command for the interface module included in a payload of the multicast read frame that includes multiple read commands for other network nodes of the switched network, and transmit a response frame including read data on the shared bus when detecting the shared bus is available for transmitting.

In Aspect 12, the subject matter of Aspect 11 optionally includes a second network master node connected to the switched network through the network interface module; and the network interface module includes a third external interface including a dedicated serial peripheral interface (SPI) connected to the second network master node.

In Aspect 13, the subject matter of one or both of Aspects 11 and 12 optionally includes logic circuitry of the network interface module configured to extract a read command for the network slave node from a received frame that includes a frame payload of multiple commands for the network slave node and other slave nodes of the switched network; and decode the read command and transmit the read data to the first network master node of the switched network when detecting the shared bus is available for transmitting.

In Aspect 14, the subject matter of one or any combination of Aspects 11-13 optionally includes a network interface module includes multiple interface types; and logic circuitry configured to extract a command for the network slave node from a received frame that includes a frame payload of multiple commands for the network slave node and other slave nodes of the switched network; and decode multiple commands for the multiple interface types included in the extracted command.

In Aspect 15, the subject matter of one or any combination of Aspects 11-14 optionally includes network interface modules coupled as slave nodes to the shared bus, and the first network master node is coupled to the shared bus via an intermediate network connection.

Aspect 16 includes subject matter (such as a method of controlling operation of a multi-drop switched network in which all network nodes see all the data that is transmitted on a shared network link) or can optionally be combined with one or any combination of Aspects 1-15 to include such subject matter, comprising sending, by a first network master node, a multicast read frame to multiple network slave nodes coupled to the shared network link; receiving the multicast read frame into a frame queue of a first network interface module of a first network slave node using a half-duplex port coupled to the shared network link; decoding, by the first network interface module, a read command for a host device coupled to the first network interface module included in a payload of the multicast read frame that includes multiple read commands for other network slave nodes of the multiple network slave nodes; and transmitting a response frame including read data on the shared network link when detecting the shared network link is available for transmitting.

In Aspect 17, the subject matter of Aspect 16 optionally includes receiving the multicast read frame on a first external interface of the first network interface module, wherein the first external interface is connected to the shared network link; receiving the read data from a host device connected to the first network interface module on a second external interface of the first network interface module; transmitting the response on the first external interface of the first network interface module; receiving a command for another slave node from a second network master node on a third external interface of the first network interface module, wherein the second network master node is not connected to the shared network link; and broadcasting the command on the first external interface when detecting the shared network link is available.

In Aspect 18, the subject matter of one or both of Aspects 16 and 17 optionally includes receiving a multicast write frame into the frame queue of the first network interface module using a first external interface of the first network interface module, wherein the first external interface is connected to the shared network link; extracting write data from a specified portion of the multicast write frame that includes multiple portions containing write data for other network slave nodes of the multiple network slave nodes; and sending the extracted write data to the host device using a second external interface of the first network interface module.

In Aspect 19, the subject matter of one or both of Aspects 16-18 optionally includes receiving a multicast command frame into the frame queue of the first network interface module, wherein a payload of the multicast command frame includes multicast read or write commands targeted to other network slave nodes of the multiple network slave nodes; decoding a first command for the first network interface module included in the payload; and decoding multiple commands for multiple interfaces of different interface types of the first network interface module included in the first command.

In Aspect 20, the subject matter of one or any combination of Aspects 16-19 optionally includes retaining the response frame in the frame queue of the first network interface module when detecting a collision on the shared network link.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A network interface module for coupling a host device to a switched network as a network node, the network interface module comprising:
   a first external interface including a single half-duplex port for communicatively coupling to a shared bus of a switched network;
   a second external interface for communicative coupling to a host device;
   at least one frame queue sized to store one multicast read frame received via the shared bus and sized to store one multicast write frame; and
   logic circuitry configured to:
   decode a read command for the interface module included in a payload of the multicast read frame that includes multiple read commands for other network nodes of the switched network;
   transmit a response frame including read data on the shared bus when detecting the shared bus is available for transmitting; and
   extract write data from a specified portion of the multicast write frame that includes multiple portions containing write data for other network nodes of the switched network and send the extracted write data to the host device.

2. The network interface module of claim 1, including a third external interface including a dedicated serial peripheral interface (SPI) for communicatively coupling a network master node to the shared bus of the switched network.

3. The network interface module of claim 1, wherein the at least one frame queue includes a higher priority frame queue and a lower priority frame queue, wherein the logic circuitry is configured to transmit a frame from the higher priority queue before transmitting a frame from the lower priority queue when detecting the shared bus is available for transmitting.

4. The network interface module of claim 1,
wherein the network interface module is included in a network slave node and the payload of the multicast read frame includes multiple commands for the network slave node and other network slave nodes, and
wherein the logic circuitry is configured to decode a command addressed to the network slave node and transmit the read data to a master node of the switched network when detecting the shared bus is available for transmitting.

5. The network interface module of claim 1, wherein the logic circuitry is configured to retain the response frame in the at least one frame queue when a collision is detected when transmitting the response frame on the shared bus.

6. The network interface module of claim 1, wherein the logic circuitry is configured to decode a read or write command for the interface module included in a payload of a frame.

7. The network interface module of claim 6, wherein the payload includes multicast read or write commands that are targeted to other network nodes.

8. The network interface module of claim 1, including:
multiple interface types; and
wherein the logic circuitry is configured to decode multiple commands for the network interface module included in a payload of a received frame, and decode multiple commands for the multiple interface types included in one command of the multiple commands.

9. The network interface module of claim 1, wherein the logic circuitry is configured to transmit the response frame without data as a frame reception acknowledgement.

10. A switched network comprising:
a first network master node; and
a network slave node, wherein the network slave node includes a host device connected to the network by a network interface module, the network interface module including:
a first external interface including a single half-duplex port connected to a shared bus of the switched network;
a second external interface connected to a host device;
at least one frame queue sized to store one multicast read frame received via the shared bus and sized to store one multicast write frame; and
logic circuitry configured to:
decode a read command for the interface module included in a payload of the multicast read frame that includes multiple read commands for other network nodes of the switched network;
transmit a response frame including read data on the shared bus when detecting the shared bus is available for transmitting; and
extract write data from a specified portion of the multicast write frame that includes multiple portions containing write data for other network nodes of the switched network and send the extracted write data to the host device.

11. The switched network of claim 10, including:
a second network master node connected to the switched network through the network interface module; and
wherein the network interface module includes a third external interface including a dedicated serial peripheral interface (SPI) connected to the second network master node.

12. The switched network of claim 10, wherein the logic circuitry of the network interface module is configured to:
extract a read command for the network slave node from a received frame that includes a frame payload of multiple commands for the network slave node and other slave nodes of the switched network; and
decode the read command and transmit the read data to the first network master node of the switched network when detecting the shared bus is available for transmitting.

13. The switched network of claim 10, wherein the network interface module includes multiple interface types; and
wherein the logic circuitry is configured to:
extract a command for the network slave node from a received frame that includes a frame payload of multiple commands for the network slave node and other slave nodes of the switched network; and
decode multiple commands for the multiple interface types included in the extracted command.

14. The switched network of claim 10, including network interface modules coupled as slave nodes to the shared bus, and wherein the first network master node is coupled to the shared bus via an intermediate network connection.

15. A method of controlling operation of a multi-drop switched network in which all network nodes see all the data that is transmitted on a shared network link, the method comprising:
sending, by a first network master node, a multicast read frame to multiple network slave nodes coupled to the shared network link;
receiving the multicast read frame into a frame queue of a first network interface module of a first network slave node using a half-duplex port coupled to the shared network link;
decoding, by the first network interface module, a read command for a host device coupled to the first network interface module included in a payload of the multicast read frame that includes multiple read commands for other network slave nodes of the multiple network slave nodes; and
transmitting a response frame including read data on the shared network link when detecting the shared network link is available for transmitting;
receiving a multicast write frame into the frame queue of the first network interface module using a first external interface of the first network interface module, wherein the first external interface is connected to the shared network link;
extracting write data from a specified portion of the multicast write frame that includes multiple portions containing write data for other network slave nodes of the multiple network slave nodes; and
sending the extracted write data to the host device using a second external interface of the first network interface module.

16. The method of claim 15, including:
receiving the multicast read frame on a first external interface of the first network interface module, wherein the first external interface is connected to the shared network link;
receiving the read data from a host device connected to the first network interface module on a second external interface of the first network interface module;
transmitting the response on the first external interface of the first network interface module;
receiving a command for another slave node from a second network master node on a third external interface of the first network interface module, wherein the second network master node is not connected to the shared network link; and
broadcasting the command on the first external interface when detecting the shared network link is available.

17. The method of claim 15, including:
receiving a multicast command frame into the frame queue of the first network interface module, wherein a payload of the multicast command frame includes multicast read or write commands targeted to other network slave nodes of the multiple network slave nodes;
decoding a first command for the first network interface module included in the payload; and
decoding multiple commands for multiple interfaces of different interface types of the first network interface module included in the first command.

18. The method of claim 15, including retaining the response frame in the frame queue of the first network interface module when detecting a collision on the shared network link.

* * * * *